(12) United States Patent
Conn et al.

(10) Patent No.: US 10,949,073 B2
(45) Date of Patent: Mar. 16, 2021

(54) DYNAMIC ADJUSTMENT OF A USER INTERFACE

(71) Applicant: Intel Corporation, Santa Clara, CA (US)

(72) Inventors: Jeremy B. Conn, Hillsboro, OR (US); Alycia Naples, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/792,493

(22) Filed: Feb. 17, 2020

(65) Prior Publication Data
US 2020/0319785 A1 Oct. 8, 2020

Related U.S. Application Data

(63) Continuation of application No. 15/961,522, filed on Apr. 24, 2018, now Pat. No. 10,606,465, which is a
(Continued)

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 1/1626* (2013.01); *G06F 3/0481* (2013.01);
(Continued)

(58) Field of Classification Search
CPC .......... G06F 3/00; G06F 3/048; G06F 3/0481; G06F 3/0482; G06F 3/0484; G06F 15/00; G09G 5/02; G06K 9/34; G06K 9/46
See application file for complete search history.

(56) References Cited

U.S. PATENT DOCUMENTS 5,469,536 A * 11/1995 Blank ................. H04N 1/3873
345/594
6,118,455 A 9/2000 Hidaka et al.
(Continued)

FOREIGN PATENT DOCUMENTS

WO 2008076816 6/2008

OTHER PUBLICATIONS

United States Patent and Trademark Office, "Advisory Action," issued in connection with U.S. Appl. No. 14/158,695 dated May 12, 2017, 3 pages.
(Continued)

*Primary Examiner* — Xiomara L Bautista
(74) *Attorney, Agent, or Firm* — Hanley, Flight & Zimmerman, LLC (57) ABSTRACT

Apparatuses, methods and storage media for user interface adjustment are described. In one instance, an apparatus may include a processor and a user interface engine operated by the processor to detect a user interface to be provided on a computing device, with the user interface including at least one user interface component, identify one or more color characteristics of an image to be used as a background for the user interface, and adjust one or more color parameters of the at least one user interface component of the user interface or the background image identified, based at least in part on the identified color characteristics of the background image, or the at least one user interface component of the user interface. Other embodiments may be described and claimed.

20 Claims, 6 Drawing Sheets

Related U.S. Application Data continuation of application No. 14/158,695, filed on Jan. 17, 2014, now Pat. No. 9,952,756.

(51) Int. Cl.
    *G06F 1/16*         (2006.01)
    *G06F 9/451*       (2018.01)
    *G06F 3/0481*     (2013.01)

(52) U.S. Cl.
    CPC ...... *G06F 3/04817* (2013.01); *G06F 3/04842* (2013.01); *G06F 9/451* (2018.02); *G06F 2203/04804* (2013.01)

(56) References Cited

U.S. PATENT DOCUMENTS

| | | |
|---|---|---|
| 6,809,741 B1 | 10/2004 | Bates et al. |
| 8,091,038 B1 | 1/2012 | Johnson et al. |
| 8,463,253 B2 | 6/2013 | Chipalkatti et al. |
| 8,847,973 B2 | 9/2014 | Calandrino et al. |
| 9,952,756 B2 | 4/2018 | Conn et al. |
| 10,606,465 B2 | 3/2020 | Conn et al. |
| 2002/0113801 A1* | 8/2002 | Reavy ............... G09G 5/02 345/589 |
| 2003/0085907 A1* | 5/2003 | Matsuoka ............ G06T 11/60 345/619 |
| 2005/0037815 A1 | 2/2005 | Besharat et al. |
| 2005/0146600 A1* | 7/2005 | Chipchase ....... H04M 1/72522 348/14.02 |
| 2008/0055616 A1 | 3/2008 | Scott et al. |
| 2008/0189656 A1 | 8/2008 | Abanami et al. |
| 2009/0012374 A1 | 1/2009 | Schmelzeisen-Redeker et al. |
| 2009/0109451 A1 | 4/2009 | Sawada |
| 2009/0319543 A1 | 12/2009 | Danton et al. |
| 2010/0033457 A1* | 2/2010 | Kim .................... H04N 5/58 345/207 |
| 2010/0141669 A1* | 6/2010 | Sadahiro ............ G09G 3/3611 345/589 |
| 2010/0328055 A1 | 12/2010 | Fong et al. |
| 2011/0035552 A1 | 2/2011 | Heynen et al. |
| 2011/0063325 A1 | 3/2011 | Saunders |
| 2012/0127198 A1 | 5/2012 | Gundavarapu |
| 2012/0200587 A1 | 8/2012 | Bapst et al. |
| 2013/0002702 A1* | 1/2013 | Schadt ................ G06T 5/001 345/593 |
| 2013/0021373 A1 | 1/2013 | Vaught et al. |
| 2013/0063486 A1* | 3/2013 | Braun ............... G02B 27/0172 345/633 |
| 2013/0129206 A1 | 5/2013 | Worthington et al. |
| 2013/0176351 A1 | 7/2013 | Abele et al. |
| 2013/0259363 A1 | 10/2013 | Ozawa et al. |
| 2013/0318466 A1* | 11/2013 | Estrada ............... G06F 3/0482 715/777 |
| 2013/0339907 A1* | 12/2013 | Matas ................. G06F 3/0485 715/853 |
| 2014/0063064 A1 | 3/2014 | Seo et al. |
| 2014/0111492 A1 | 4/2014 | Liang |
| 2014/0184841 A1 | 7/2014 | Woo et al. |
| 2015/0089348 A1 | 3/2015 | Jose |
| 2015/0286372 A1* | 10/2015 | Swindell ............. G06F 3/0482 715/762 |

OTHER PUBLICATIONS

United States Patent and Trademark Office, "Final Office Action," issued in connection with U.S. Appl. No. 14/158,695 dated Feb. 9, 2017, 15 pages.

United States Patent and Trademark Office, "Non-Final Office Action," issued in connection with U.S. Appl. No. 14/158,695 dated Jul. 14, 2017, 12 pages.

United States Patent and Trademark Office, "Non-Final Office Action," issued in connection with U.S. Appl. No. 14/158,695 dated Sep. 9, 2016, 11 pages.

United States Patent and Trademark Office, "Notice of Allowance," issued in connection with U.S. Appl. No. 14/158,695 dated Dec. 15, 2017, 11 pages.

International Searching Authority, "International Search Report and Written Opinion", issued in connection with International Application No. PCT/US2014/065287 dated Feb. 10, 2015, 14 pages.

International Searching Authority, "International Preliminary Report", issued in connection with International Application No. PCT/US2014/065287 dated Jul. 28, 2016, 11 pages.

United States Patent and Trademark Office, "Non-Final Office Action," issued in connection with U.S. Appl. No. 15/961,522 dated Jun. 27, 2019, 15 pages.

United States Patent and Trademark Office, "Notice of Allowance," issued in connection with U.S. Appl. No. 15/961,522 dated Nov. 18, 2019, 9 pages.

* cited by examiner

DYNAMIC ADJUSTMENT OF A USER INTERFACE

RELATED APPLICATIONS

This patent arises from a continuation of U.S. application Ser. No. 15/961,522, titled "DYNAMIC ADJUSTMENT OF A USER INTERFACE," filed Apr. 24, 2018, which is a continuation of U.S. application Ser. No. 14/158,695 (now U.S. Pat. No. 9,952,756), filed Jan. 17, 2014, titled "DYNAMIC ADJUSTMENT OF A USER INTERFACE," both of which are hereby incorporated by reference herein in their entireties.

TECHNICAL FIELD

The present disclosure relates to the field of computing device interfaces, in particular, to apparatuses, methods and storage media associated with dynamic adjustment of a user interface of a computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently, if a user wishes to personalize a background of a user interface displayed on her computing device (e.g., smartphone), she may select any picture, photo, or background theme available on the Web or her device and designate the selected image as a default interface background. The selected interface background may have different colors, elements, and the like. In some instances, the selected interface background may interfere with content provided on top of the background. For example, viewing various user interface screens overlaying a particular background may prove challenging, considering that the interface screen colors may have different user interface components, each having its own color, contrast, and brightness parameters. Accordingly, legibility of various user interface components, when provided on the particular interface background may vary and in some cases may diminish, contributing to user dissatisfaction in using the device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Apparatuses, methods and storage media for dynamic user interface adjustment on a computing device are described herein. In one instance, an apparatus may comprise a processor and a user interface engine operated by the processor to detect a user interface to be provided on the computing device, identify one or more color characteristics of an image comprising a background for the user interface, and adjust one or more color parameters of the user interface components of the user interface or the background image identified, based at least in part on the identified color characteristics of the background image or the at least one user interface component of the user interface. The user interface may include one or more user interface components, including controls, buttons, icons, windows, text, and the like. Adjusting the interface may include blurring the background image or substantially inversely changing at least one of the color parameters of the user interface component relative to a corresponding color characteristic of the background image.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
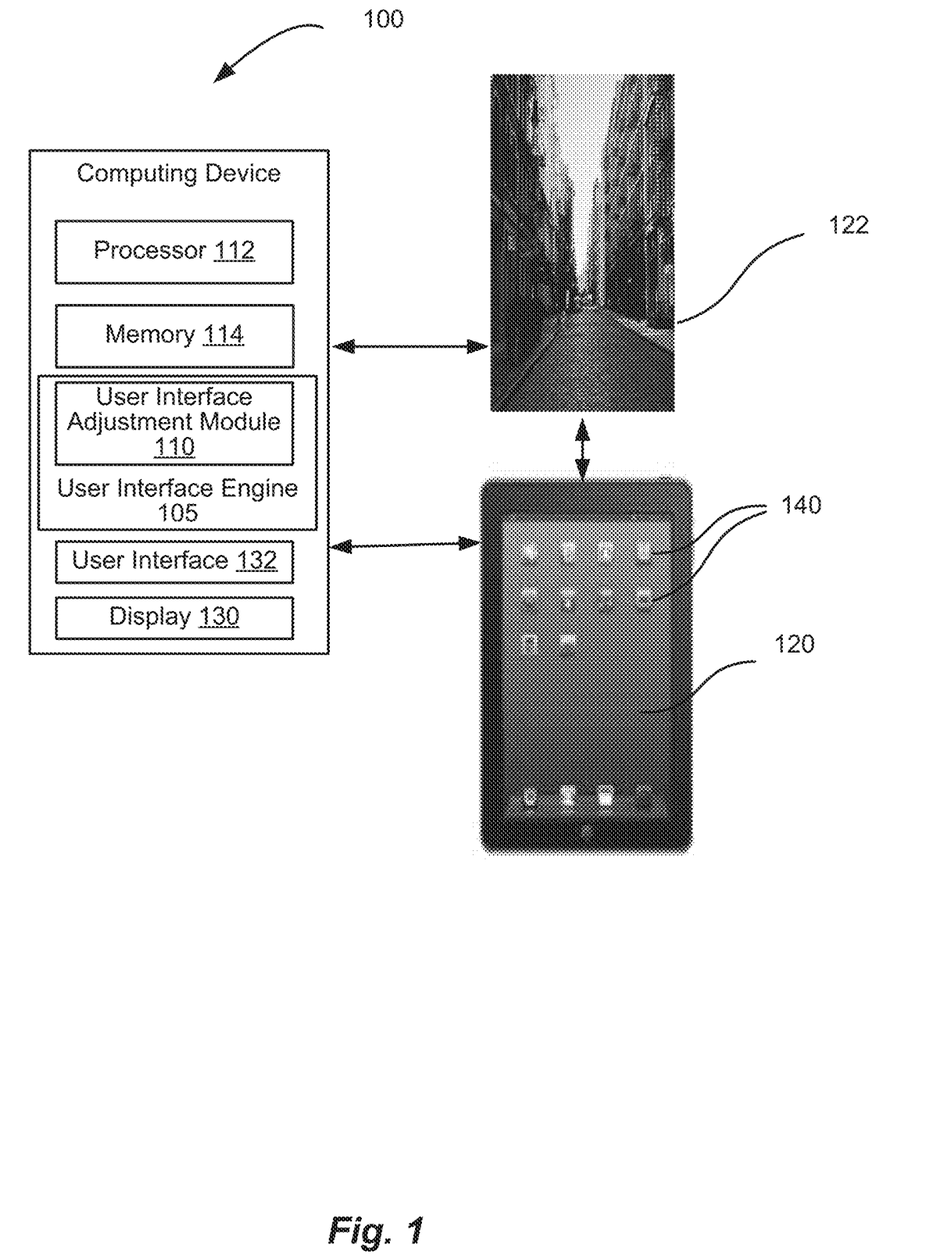
FIG. 1 is a block diagram illustrating an example computing device configured to enable user interface adjustment, in accordance with some embodiments.

FIG. 1 is a block diagram illustrating an example computing device 100 configured to enable user interface adjustment, in accordance with various embodiments. The computing device 100 may include any computing device having a processor 112 and a memory 114. The processor 112 may include any type of processors, such as a central processing unit (CPU), a microprocessor, and the like. The processor 112 may be implemented as an integrated circuit having multi-cores, e.g., a multi-core microprocessor.

The memory 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth. Examples of structures of the computing device 100 will be described in greater detail in reference to FIG. 6.

In some embodiments, the computing device 100 may include a display 130 configured to enable a computing device user interface 132 be rendered thereon. The user interface 132 may include various user interface instances (e.g., screens), such as, for example, user interface (screen) 120, having one or more user interface components 140 (e.g., selectable elements and other user interface components, including, but not limited to, navigation controls, panes, icons, buttons, drop-down menus, windows and the like), as well as including content of various types (image, video, audio), or a combination thereof. The user interface 132 may also include Web pages and other content that may be accessible by the computing device 100, e.g., via an appropriate network (e.g., Internet). Hereinafter, for simplicity purposes, a user interface instance (e.g., screen) will be called a user interface.

In some embodiments, the computing device 100 may be configured to enable a background be provided for the user interface 132. For example, a background (such as, for example, a background image 122) may be a default background set by a manufacturer of the computing device 100, or set by a program or application executing on the computing device 100 by default or in response to a user selection/input. In some embodiments, the background may be selectable by the user from images accessible by the computing device 100. For example, the user may select a background from a selection of various background images (e.g., color themes, pictures, illustrations, cartoons, wallpaper patterns, and the like) provided by the computing device 100. In another example, the user may select a background image from pictures retrievable from memory 114 or otherwise accessible by the computing device 100. For example, the user interface background image may be selected from the photos captured by the user with an image capture component (e.g., digital camera) associated with the computing device 100. The user interface 132 (e.g., the screen 120), when displayed on the display 130, may overlay the background (e.g., background 122) selected by the user or provided by the computing device 100 as described above.

In some embodiments, the computing device 100 may include a user interface engine 105 associated with (e.g., residing on or otherwise accessibly by) the computing device 100. The user interface engine 105 may be configured to output a user interface to the computing device 100 (e.g., on behalf of an operating system or an application executing on the computing device 100) and to facilitate conduct of other operations associated with the provision of the user interface as necessary, e.g., receiving and routing inputs from a user. In embodiments, the user interface engine 105 may include an adjustment module 110 to dynamically adjust components of the user interface and/or the background image, such that the user interface and the background image are more complementary to each other to provide improved readability to the user interface. The user interface engine 105 including user interface adjustment module 110 may comprise hardware, software, firmware, or a combination thereof and may be configured to execute instructions related to dynamic user interface adjustment as described herein. The user interface adjustment module 110 may be configured to analyze the background image 122 to identify one or more color characteristics of the background image 122. For example, the user interface adjustment module 110 may identify brightness, average color, color saturation, and any other color characteristics of the background image 122. The user interface adjustment module 110 may identify color characteristics of the background image 122 using various color analysis techniques or color models, such as, for example, lightness, a, and b (LAB); red, green and blue (RGB); hue, saturation, and lightness (HSL); hue, saturation, and brightness (HSB); hue, saturation, and intensity (HSI); hue, saturation, and value (HSV); cyan, magenta, yellow, and key (CMYK); and the like.

In response to a detection (e.g., user selection) of a particular user interface 132 (e.g., screen 120) to be provided on the display 130, the user interface adjustment module 110 may identify the user interface components 140 (e.g., controls, images, content, and the like) included in the screen. For example, the user interface adjustment module 110 may use a crawler to parse the user interface 132 in order to identify the user interface components 140.

In some embodiments, the user interface adjustment module 110 may be configured to adjust color parameters of the identified user interface components 140 included in the user interface 132 (e.g., screen 120) and/or the background image, to provide desired contrast with the selected background, thus ensuring desired legibility of the user interface components when displayed overlaying the selected background. More specifically, the user interface adjustment module 110 may be configured to adjust one or more color parameters of the user interface components 140 of the user interface 132 (e.g., screen 120) and/or the background image, based on the identified color characteristics of the background image 122 and/or components of the user interface.

In some embodiments, the user interface adjustment may include substantially inversely changing at least one of the color parameters of the user interface components 140 relative to a corresponding color characteristic of the background image 122. For example, one of the identified color characteristics of the background image 120 may include image brightness. The user interface adjustment module 110 may be configured to adjust (e.g., inversely change) a corresponding color parameter (brightness) of the user interface component 140, based on the identified background image brightness.

For example, the user interface adjustment module 110 may increase the brightness of the user interface component 140 (e.g., up to a determined value) if the brightness of the background image 120 is determined to be below a first threshold. In another example, the user interface adjustment module 110 may decrease the brightness of the user interface component 140 (e.g., down to a second determined value) if the brightness of the background image 120 is determined to be above a second threshold.

In some embodiments, the substantially inverse change of the color parameters of the user interface component 140 may include a change that is inversely proportionate to an identified corresponding color characteristic of the background image 120. For example, the higher the brightness of the background image 120 is determined to be, the lower the brightness of the user interface component 140 may be adjusted.

In some embodiments, the user interface adjustment module 110 may be configured to determine external conditions, such as ambient light conditions (e.g., ambient light brightness, light intensity, and the like) associated with the computing device 100, and further adjust the color parameters of the user interface components 140 of the user interface 132 based on the determined ambient light conditions. For example, the determined ambient light conditions may affect legibility of the user interface, by, for example, enhancing the brightness of the background image. In other words, the brighter the ambient light may be, the harder may be to comprehend the user interface provided on the background image. In this instance, the user interface adjustment module 110 may be configured to further adjust (e.g., decrease) the brightness of the user interface components 140 to make them contrast and legible relative to the background in a particular ambient light.

In some embodiments, in order to further increase legibility of the user interface 130 overlaying the background image 120, the user interface adjustment module 110 may be further configured to de-emphasize the background image 120. For example, the user interface adjustment module 110 may blur the background image 120, based, at least in part, on the identified color characteristics of the background image 120. More specifically, the user interface adjustment module 110 may be further configured to apply a Gaussian blur to adjust the color characteristics of the background image.

A blur level of the background image 120 may be determined, for example, based on the background image 120's average color characteristic or any appropriate combination of color parameters, such as brightness, average color, determined number of colors comprising average color, color distribution, and the like. For example, for substantially monochromatic background (e.g., comprising a blue sky), the blurring may be done to a first blur threshold value, while for a substantially polychromatic (color-intensive) background, the blurring may be done to a second threshold value that is higher, or lower, than the first threshold value.

In some embodiments, the user interface adjustment module 110 may be further configured to modify the color of the user interface components by adding at least a proportion of an average color of the background image. For example, the user interface adjustment module 110 may determine the average color of the background image 120 and imbue at least a shade of the color into the color parameters of the user interface component 140.

In some embodiments, the user interface adjustment module 110 may be further configured to adjust color parameters of a user interface component 140 included in another user interface component 140, based on the adjusted color parameters of that another interface component. For example, the user interface component 140 may include a window having a window background and a text placed on the window background. The color parameters of the user interface component 140 may include a value indicating a brightness of the window background and another value indicating a brightness (or color) of the text included in the window. The user interface adjustment module 110 may adjust (e.g., inversely change) the brightness of the window background based on the determined brightness of the user interface background 120, as discussed above. The user interface adjustment module 110 may further adjust (e.g., inversely change) the brightness (or color) of the text relative to the adjusted brightness of the window background, in order to increase legibility of the text displayed in the window.

Figure 2:
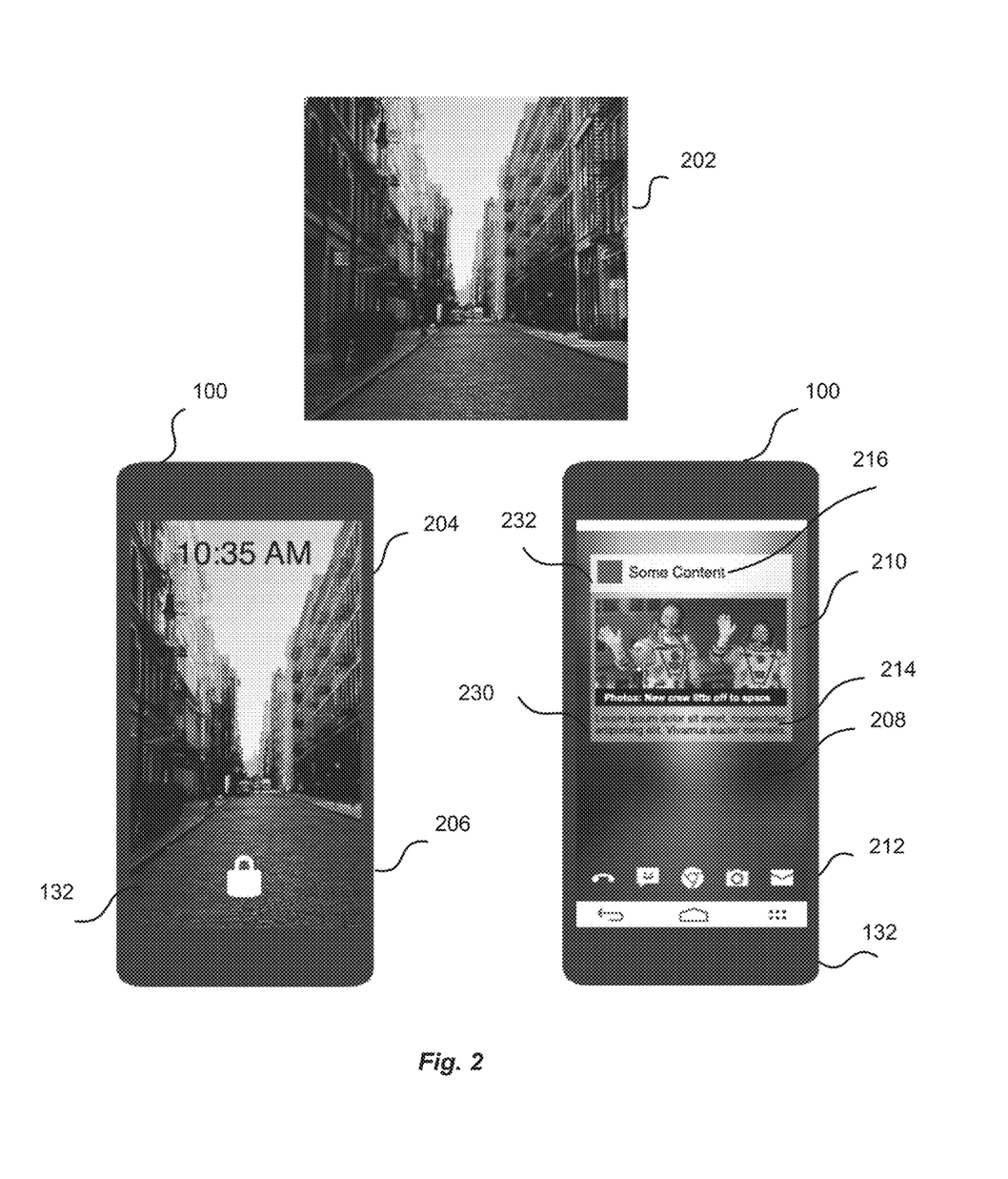
FIG. 2 illustrates an example user interface adjustment process, in accordance with some embodiments.

FIG. 2 illustrates an example user interface adjustment process 200, in accordance with some embodiments. For the purposes of illustration, it is assumed that a background image 202 may be selected as a background for the device 100's user interface 132. For example, a user may capture, or otherwise access, with the computing device 100, the image 202, which the user wishes to select as a background for the device 100's user interface 132. It is assumed further that the image 202 happens to have a dark color palette, e.g., the brightness of the image 202 may be below a first brightness threshold. The image 202 may be disposed as background 204 for the user interface 132. For example, the image 202 is shown on the display 132 of the computing device 100, such as on the lock screen 206 of the device 100.

In the example of FIG. 2, the user has navigated to another screen of the user interface 132, e.g., home screen 210, or the home screen 210 may have been provided to the user by an application executing on the computing device 100. The user interface adjustment module 110 may detect the home screen 210 and blur the image 202 (as illustrated by the blurred background image 208) to improve focus and increase content legibility of the home screen 210. The user interface adjustment module 110 may adjust the user interface components, such as the core user interface controls 212 to be appropriately contrasted on the background image 208's dark color palette. More specifically, the color parameters of the core user interface controls 212 may be adjusted to provide a variant of white color, as shown. The color parameters of other user interface components, such as windows and panes 230, 232 may be adjusted in a similar manner, to provide a contrast and desired legibility on the background image 208. The color parameters of text strings 214, 216 may also be adjusted to provide a contrast, and consequently, desired legibility, relative to the panes or windows (e.g., 230, 232). For example, the text string 214 may be adjusted to become a variant of black color to provide the text legibility, in contrast to a light-colored pane 230.

Figure 3:
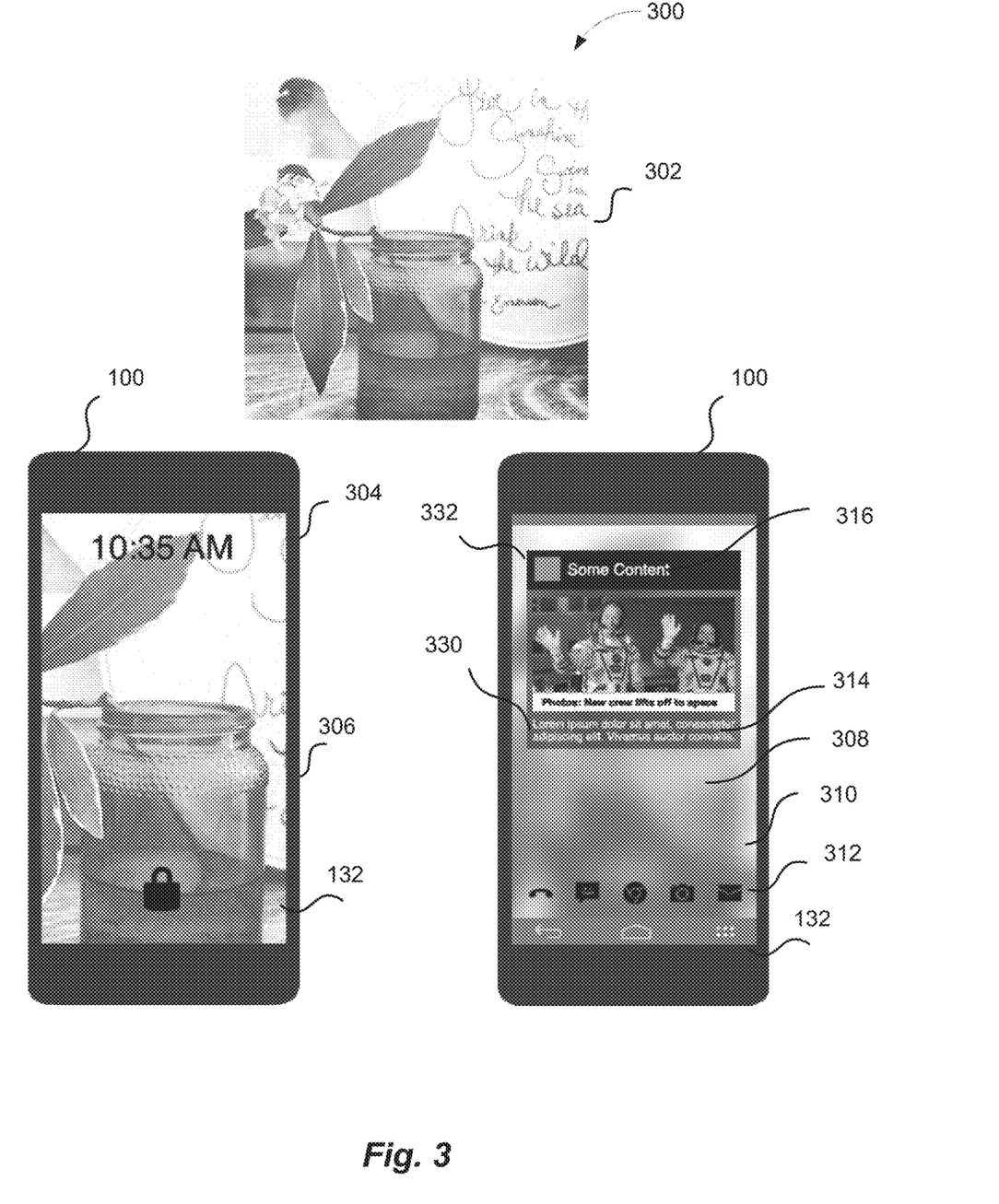
FIG. 3 illustrates another example user interface adjustment process 300, in accordance with some embodiments.

FIG. 3 illustrates another example user interface adjustment process 300, in accordance with some embodiments. Assume a user captured or otherwise accessed, with the computing device 100, an image 302, which the user wishes to select as a background for the device 100's user interface 132. Assume further that the image 302 happens to have a light color palette, e.g., the brightness of the image 302 may be above a second determined brightness threshold (that may be higher than the first brightness threshold). The image 302 may be disposed as background 304 for the user interface 132. For example, the image 302 is shown on the display 130 of the computing device 100, such as on the lock screen 306 of the device 100.

Assume that the user has navigated to another screen of the user interface 132, e.g., home screen 310. The user interface adjustment module 110 may detect the home screen 132 and blur the image 302 (as illustrated by the blurred background image 308) to improve focus and increase content legibility of the home screen 310. The user interface adjustment module 110 may adjust the user interface components, such as the core user interface controls 312 to be appropriately contrasted on the background image 308's light color palette. More specifically, the color parameters of the core user interface controls 312 may be adjusted to provide a variant of black color, as shown. The color parameters of other user interface components, such as windows and panes 330, 332 may be adjusted in a similar manner, to provide a contrast and desired legibility on the background image 308. The color parameters of text strings 314, 316 may also be adjusted to provide a contrast, and consequently, desired legibility, relative to the panes or windows (e.g., 330, 332). For example, the text string 314 may be adjusted to become a variant of white color to provide the text legibility, in contrast to the dark-colored pane 330.

In some embodiments, in order to save computing resources to be used for dynamic adjustment of a user interface described above, the adjustment of at least some of the color parameters of the user interface components may be pre-determined. For example, a color characteristic (e.g., brightness, color saturation, or the like) of the background image may range from 0 to 100. This range may be divided in a number of sub-ranges, as desired. Each sub-range may correspond to a pre-determined value (or range of values) of a corresponding color parameter of a user interface component (e.g. brightness of a user interface control). For example, if a value indicating brightness, average color, or any other desired color characteristic of the background image is determined to be within a particular sub-range, a corresponding color parameter of the user interface component included in a particular screen may be adjusted to a pre-determined value corresponding to the determined sub-range.

In some embodiments, the color parameters of a user interface (e.g., a screen having user interface components) may be adjusted, depending on determined color characteristics of the background, to conform to a pre-determined color theme. The example of the user interface adjustment described in reference to FIGS. 2-3 illustrates adjustment of the user interface to two color themes that may be selected based on determined color characteristics (e.g., brightness) of the background. For example, FIG. 2 illustrates adjustment of the user interface 132 (home screen 210) to a "light color theme" provided on a dark-colored background 208. FIG. 3 illustrates adjustment of the user interface 132 (home screen 310) to a "dark color theme" provided on a dark-colored background 308. One skilled in the art will appreciate that multiple color themes may be pre-defined to match particular determined color characteristics of a background.

Figure 4:
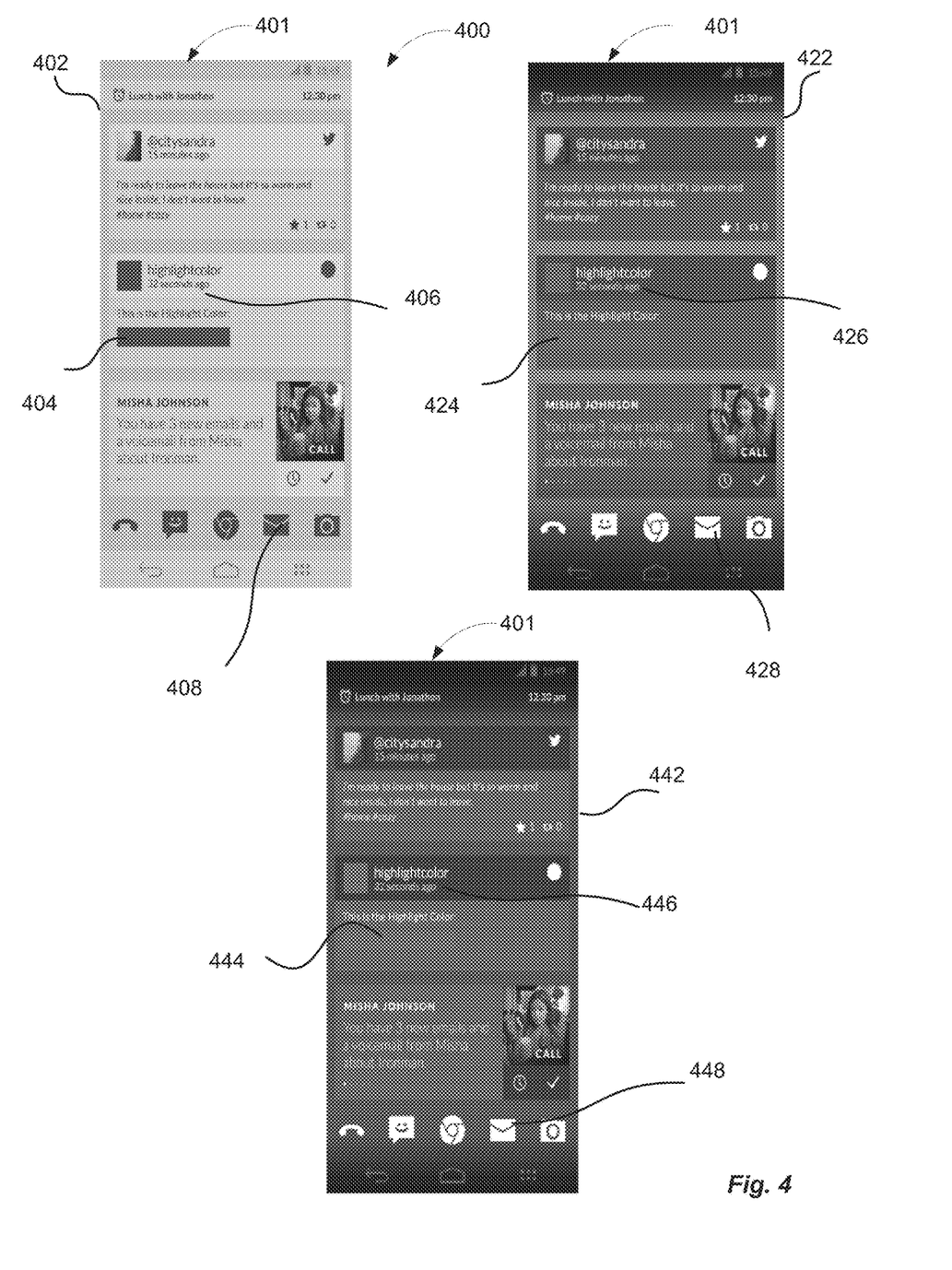
FIG. 4 illustrates an example color theme set comprising three pre-defined color themes that may be selected to adjust a user interface based on determined color characteristics of a background image, in accordance with some embodiments.

FIG. 4 illustrates an example color theme set 400 comprising three pre-defined color themes 402, 422, and 442 that may be selected to adjust a user interface (e.g., a screen 401 shown in FIG. 4 with the applied color themes 402, 422, and 442) based on determined color characteristics of a background image, in accordance with some embodiments. The set 400 comprising three color themes 402, 422, and 442 is provided and described herein for illustrative purposes only. As discussed above, multiple color themes may be pre-defined and applied to adjust a user interface (e.g., screens) responsive to determined color characteristics of the background, such as brightness, average color, and the like.

As discussed above, in some embodiments, the color themes 402, 422, and 442 may be applied to the user interface (e.g., screen 401) in substantially inverse proportion to the determined brightness of the background image (not shown in FIG. 4 for simplicity). In other words, the brighter the background image is determined to be, the darker color theme may be applied to the user interface, to enhance contrast of the user interface on the provided background. For example, a light color theme 402 may be applied to the screen 401 if the brightness of the background image is determined to be greater than approximately 75 units (e.g., about 75%). The dark color theme 442 may be applied to the screen 401 if the brightness of the background image is determined to be less or equal approximately 50 units (e.g., about 50%). The medium color theme 422 may be applied to the screen 401 if the brightness of the background image is determined to be approximately between 50 and 75 units (e.g., about 50% and 75%).

In some embodiments, the color characteristics of one or more (or all) user interface components may be adjusted according to the applied color theme. For example, the color of the user interface control 428 (in the medium color theme 422) or 448 (in the dark color theme 442) may be adjusted to #FFFFFF (e.g., a shade of white color in hexadecimal format). The color of the text 426 (in the medium color theme 422) or 446 (in the dark color theme 442) may be adjusted to #D7D7D7 (e.g., a light shade of grey color in hexadecimal format).

In some embodiments, in addition or in the alternative to changing the brightness or adjusting the color of the user interface components to a set value as described above, other user interface adjustments aimed at increasing legibility may be implemented. For example, based on the determined average color of the background image, the colors of various interface components (e.g., 404, 406, 408) may be adjusted to include some proportion of the determined background average color. For example, the average color (and average color at 100% saturation) of the background image may be determined (e.g., in RGB or HSB space) and the color of a user interface component may be adjusted by modifying its HSB values.

For example, the lightness of average color and average color at 100% saturation may be compared in the LAB color space. If the difference between the lightness is less than 50 units (e.g., 50%), the highlight color (e.g., 404 in the light color theme 402, 424 in the medium color theme 422 or 444 in the dark color scheme 442) may become the inverted value of the average color at 100% saturation. In another example, the colors of the control 408, the color 404, and the text 406 in the light color theme 402 may be adjusted based on the average color of the background as follows: H value may stay the same, S value may increase to 100%, and B may change to 25%. The pane colors may be also pre-set to particular values for each color theme.

Figure 5:
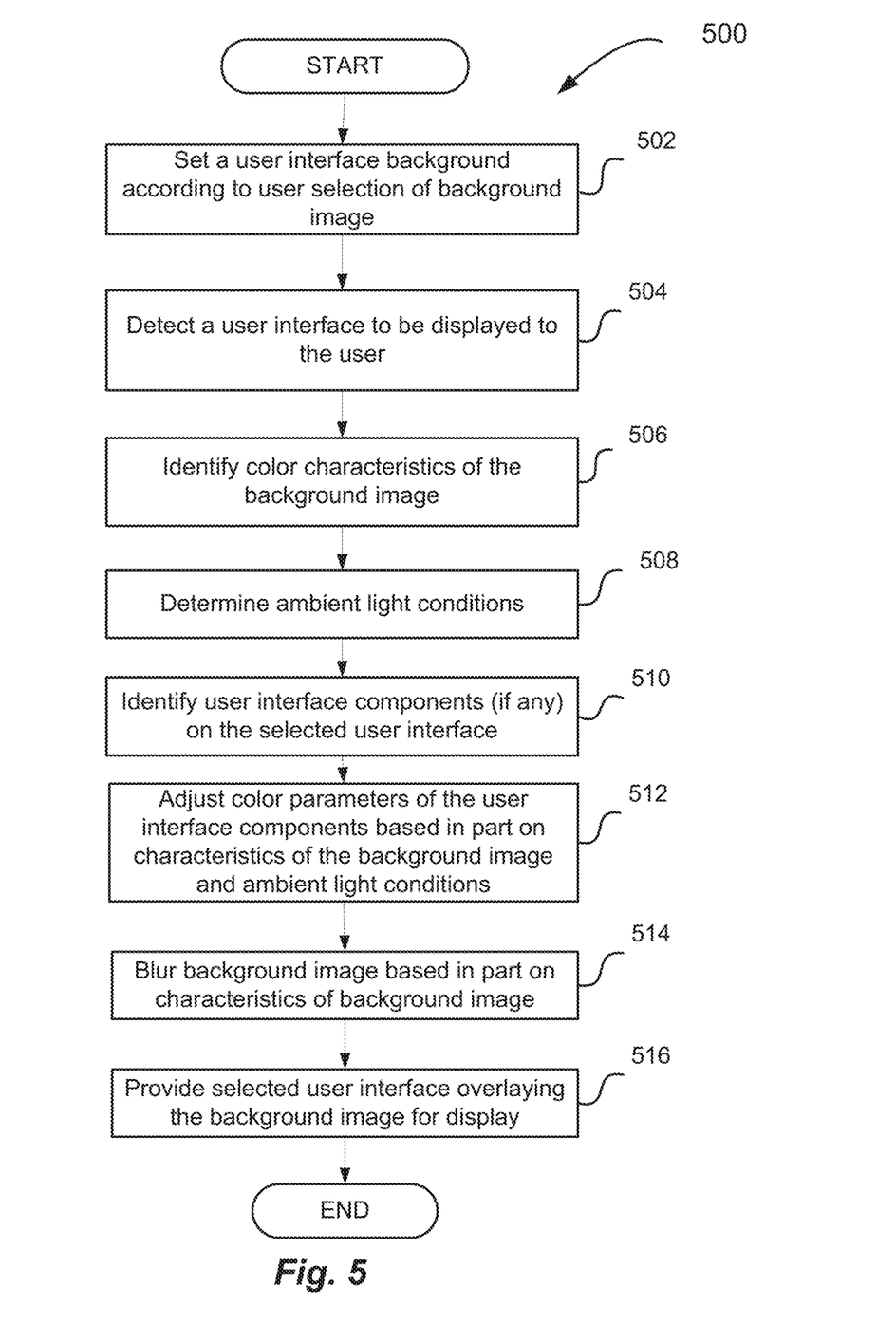
FIG. 5 is an example process flow diagram illustrating a process for user interface adjustment, in accordance with some embodiments.

FIG. 5 illustrates a process 500 for user interface adjustment, in accordance with some embodiments. The process 500 may be performed, for example, by the user interface adjustment module 110 of the computing device 100, described in reference to FIG. 1.

The process 500 may begin at block 502, where may a user interface background may be set, e.g., by the user interface engine 105 of computing device 100, according to a user selection of a background image or otherwise provided by the device 100, as described in reference to FIG. 1.

At block 504, a user interface (e.g., a user interface instance such as a screen) to be displayed to the user may be detected, e.g., by the user interface adjustment module 110 of computing device 100.

At block 506, color characteristics of the background image, such as brightness, average color, saturation, intensity, and the like may be identified, e.g., by the user interface adjustment module 110 of computing device 100.

At block 508, ambient light conditions associated with the device 100, such brightness of ambient light, for example may be determined, e.g., by the user interface adjustment module 110 of computing device 100. For example, the computing device 100 may include sensor configured to detect the ambient light conditions, and determine and provide data corresponding to the determined ambient light conditions to the user interface adjustment module 110.

At block 510, user interface components (if any) on the detected user interface may be identified, e.g., by the user interface adjustment module 110. For example, the user interface adjustment module may parse the user interface to identify user interface components and determine their type (e.g., control, image, text, and the like) and the user interface control parameters (size, color parameters, location, and the like). For example, as one skilled in the art would appreciate, the user interface adjustment module may access a storage repository associated with the computing device 100 that may cache the attributes associated with the identified user interface components, and retrieve the color parameters of the user interface components cached in the repository.

At block 512, color parameters of the user interface components based in part on characteristics of the background image and (optionally) on the determined ambient light conditions may be adjusted, e.g., by the user interface adjustment module 110 of the computing device.

At block 514, background image based in part on characteristics of background image may be blurred, e.g., by the user interface adjustment module 110 of computing device 100, using for example, Gaussian blur or other techniques known in the art.

At block 516, selected user interface with adjusted color parameters may be provided, e.g., by the user interface adjustment module 110 of computing device 100, overlaying the background image for display, on the display 130 of the computing device 100.

Figure 6:
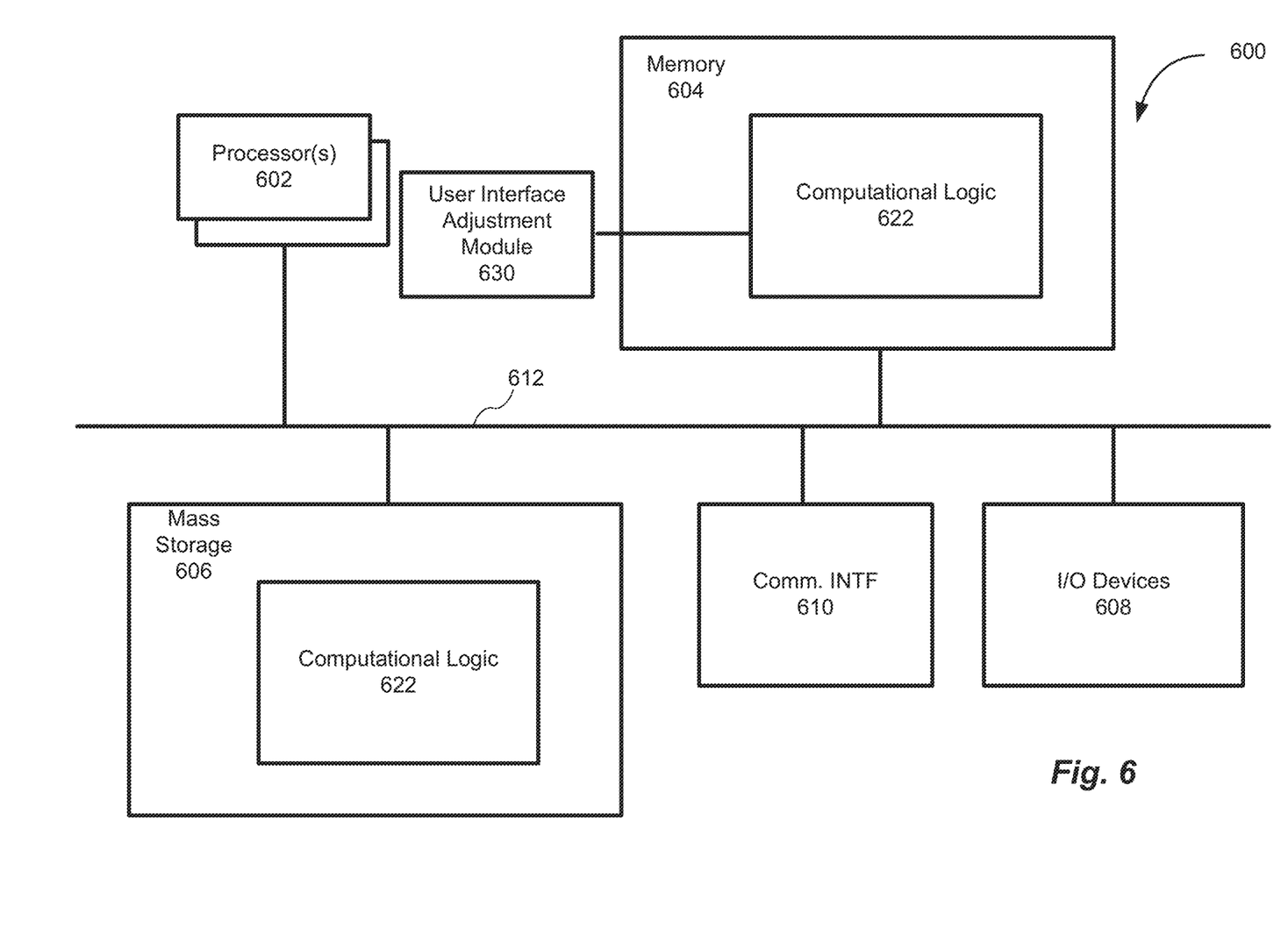
FIG. 6 illustrates an example computing environment suitable for practicing various aspects of the disclosure, in accordance with various embodiments.

FIG. 6 illustrates an example computing device 600 suitable for use for various components of FIG. 1, such as computing device 100 of FIG. 1, in accordance with various embodiments. As shown, computing device 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, volatile memory (e.g., DRAM), compact disc read only memory (CD-ROM), digital versatile disk (DVD) and so forth), input/output devices 608 (such as display (e.g., touchscreen display), keyboard, cursor control, remote control, gaming controller, image capture device, and so forth) and communication interfaces 610 (such as network interface cards, modems, infrared receivers, radio receivers (e.g., Bluetooth), and so forth).

The communication interfaces 610 may include communication chips (not shown) that may be configured to operate the device 600 (or 100) in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 6G, and beyond. The communication interfaces 610 may operate in accordance with other wireless protocols in other embodiments.

The above-described device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations associated with device 100, e.g., operations described in reference to FIG. 5. The various elements may be implemented by assembler instructions supported by processor(s) 602 or high-level languages that may be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of the elements 608, 610, 612 may vary, depending on whether computing device 600 is used as a stationary computing device, such as a set-top box or desktop computer, or a mobile computing device such as a tablet computing device, laptop computer, game console, or smartphone. Their constitutions are otherwise known, and accordingly will not be further described.

At least one of processors 602 may be packaged together with computational logic 622 configured to practice aspects of embodiments described in reference to FIGS. 1-5. For one embodiment, at least one of processors 602 may be packaged together with computational logic 622 configured to practice aspects of process 500 of FIG. 5 to form a System in Package (SiP) or a System on Chip (SoC). For at least one embodiment, the SoC may be utilized in, e.g., but not limited to, a mobile computing device such as a computing tablet or smartphone. For example, computational logic 622 may be associated with, or otherwise configured to include or access, user interface adjustment module 630 similar to the user interface adjustment module 110 described in reference to FIGS. 1 and 5.

In various implementations, the computing device 600 may comprise a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

The following paragraphs describe examples of various embodiments. Example 1 is least one non-transitory computer-readable medium comprising executable instructions for providing an user interface, including adjustment of the user interface that, in response to execution of the instructions by a computing device, cause the computing device to: detect a user interface to be provided on the computing device, the user interface including at least one user interface component; identify one or more color characteristics of an image to be used as a background for the user interface; adjust one or more color parameters of the at least one user interface component of the user interface or the background image identified, based at least in part on the color characteristics of the at least one user interface component of the user interface and the background image identified; and provide the user interface with at least one user interface component adjusted, overlaying the background.

Example 2 may include the subject matter of Example 1, and further specifies that to adjust one or more color parameters of the background image identified comprises to blur the background image based at least in part on the identified color characteristics of the background image or the at least one user interface component of the user interface.

Example 3 may include the subject matter of Example 2, and further specifies that to blur the background image comprises to apply a Gaussian blur to adjust the color characteristics of the background image.

Example 4 may include the subject matter of Example 1, and further specifies that the color characteristic of the background image includes a first value indicating an image brightness and the corresponding color parameter includes a second value indicating the user interface component brightness.

Example 5 may include the subject matter of Example 1, and further specifies that to adjust includes to substantially inversely change at least one of the color parameters of the user interface component relative to a corresponding color characteristic of the background image.

Example 6 may include the subject matter of Example 5, and further specifies that to substantially inversely change at least one of the color parameters of the user interface component relative to a corresponding color characteristic of the background image comprises to increase the second value to a first determined value if the first value is determined to be below a first threshold, or to decrease the second value to a second determined value if the first value is determined to be above a second threshold.

Example 7 may include the subject matter of Example 1, and further specifies that the user interface component comprises at least one of an icon, a button, a window, an image, or a combination thereof.

Example 8 may include the subject matter of Example 1, and further specifies that the instructions, in response to execution of the instructions by the computing device, further cause the computing device to determine ambient light conditions of the computing device, wherein to adjust one or more color parameters of the at least one user interface component of the user interface comprises to adjust the one or more color parameters based on the ambient light conditions determined.

Example 9 may include the subject matter of any of Examples 1 to 8, and further specifies that the instructions, in response to execution of the instructions by the computing device, further cause the computing device to identify the at least one user interface component on the user interface detected.

Example 10 is an apparatus for providing user interface, including user interface adjustment, comprising: a processor; and a user interface engine operated by the processor to: detect a user interface to be provided on a display device associated with the apparatus, the user interface including at least one user interface component; identify one or more color characteristics of an image to form a background for the user interface; and adjust one or more color parameters of the at least one user interface component of the user interface or the background image identified, based at least in part on the color characteristics of the background image identified or the at least one user interface component of the user interface.

Example 11 may include the subject matter of Example 10, and further specifies that the background image includes one of a photo or a theme selectable by the user.

Example 12 may include the subject matter of Example 10, and further specifies that the user interface engine is further operated by the processor to provide the user interface overlaying the background image on the computing device.

Example 13 may include the subject matter of Example 10, and further specifies that to adjust comprises to substantially inversely change at least one of the color parameters of the user interface component relative to a corresponding color characteristic of the background image.

Example 14 may include the subject matter of Example 13, and further specifies that the color characteristic of the background image includes a first value indicating an image brightness, and wherein the corresponding color parameter includes a second value indicating the user interface component brightness.

Example 15 may include the subject matter of Example 14, and further specifies that the user interface engine is further operated by the processor to increase the second value to a first determined value if the first value is determined to be below a first threshold, or to decrease the second value to a second determined value if the first value is determined to be above a second threshold.

Example 16 may include the subject matter of any of Examples 10 to 15, and further specifies that the user interface engine is further operated by the processor to determine an average color characteristic indicating an average color of the background image; and modify the one or more color parameters of the at least one user interface component to include at least a proportion of the determined average color of the background image.

Example 17 is a computer-implemented method for providing user interface, including user interface adjustment, comprising: detecting, by a computing device, a user interface to be provided on the computing device, the user interface including at least one user interface component; identifying, by the computing device, one or more color characteristics of an image comprising a background for the user interface; and adjusting, by the computing device, one or more color parameters of the at least one user interface component of the user interface or the background image identified, based at least in part on the color characteristics of the background image identified or the at least one user interface component of the user interface.

Example 18 may include the subject matter of Example 17, and further specifies that the adjusting includes substantially inversely changing at least one of the color parameters of the user interface component relative to a corresponding color characteristic of the background image.

Example 19 may include the subject matter of Example 18, and further specifies that the user interface component includes a window having a window background and a text placed on the window background, wherein the at least one of the color parameters of the user interface component includes a value indicating a brightness of the window background.

Example 20 may include the subject matter of Example 19, and further specifies that the adjusting further includes substantially inversely changing, by the computing device, a text color parameter relative to the brightness value of the window background, the text color parameter indicating a color of the text.

Example 21 may include the subject matter of Example 17, and further specifies that the method further comprises: determining, by the computing device, ambient light conditions of the computing device, wherein the adjusting one or more color parameters of the at least one user interface component of the user interface is further based on the determined ambient light conditions.

Example 22 may include the subject matter of any of Examples 17 to 21, and further specifies that the method further comprises: providing, by the computing device, the user interface overlaying the background image on the computing device.

Example 23 is an apparatus for providing an user interface, including adjustment of the user interface, the apparatus comprising: means for detecting a user interface to be provided on the computing device, the user interface including at least one user interface component; means for identifying one or more color characteristics of an image to be used as a background for the user interface; means for adjusting one or more color parameters of the at least one user interface component of the user interface or the background image identified, based at least in part on the color characteristics of the at least one user interface component of the user interface and the background image identified; and means for providing the user interface with at least one user interface component adjusted, overlaying the background.

Example 24 may include the subject matter of Example 23, and further specifies that the means for adjusting one or more color parameters of the background image identified further includes means for blurring the background image based at least in part on the identified color characteristics of the background image or the at least one user interface component of the user interface.

Example 25 may include the subject matter of Example 24, and further specifies that the means for blurring the background image comprises means for applying a Gaussian blur to adjust the color characteristics of the background image.

Example 26 may include the subject matter of Example 23, and further specifies that the color characteristic of the background image includes a first value indicating an image brightness, and wherein the corresponding color parameter includes a second value indicating the user interface component brightness.

Example 27 may include the subject matter of any of Examples 23 to 26, and further specifies that the means for adjusting includes means for substantially inversely changing at least one of the color parameters of the user interface component relative to a corresponding color characteristic of the background image.

Example 28 may include the subject matter of Example 27, and further specifies that the means for substantially inversely changing at least one of the color parameters of the user interface component relative to a corresponding color characteristic of the background image comprises means for increasing the second value to a first determined value if the first value is determined to be below a first threshold, or for decreasing the second value to a second determined value if the first value is determined to be above a second threshold.

Computer-readable media (including non-transitory computer-readable media), methods, apparatuses, systems and devices for performing the above-described techniques are illustrative examples of embodiments disclosed herein.

Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computer comprising:
   a camera;
   wireless communication circuitry;
   a touchscreen to present a plurality of user interface components, at least one of the plurality of user interface components to include a window and at least one of the plurality of user interface components to include text;
   memory; and
   processor circuitry to execute instructions to:
   set a first display color of the window based on a first color characteristic of a first background image;
   set a second display color of the text based on the first color characteristic of the first background image;
   cause presentation of the window with the first display color, the text with the second display color, and at least a portion of the first background image on the touchscreen; and
   in response to a change from the first background image to a second background image:
   adjust the first display color of the window to a third display color based on a second color characteristic of the second background image;
   adjust the second display color of the text to a fourth display color based on the second color characteristic of the second background image; and
   cause presentation of the window with the third display color, the text with the fourth display color, and at least a portion of the second background image on the touchscreen, the text to be presented near an upper edge of the window.

2. The computer of claim 1, wherein the second background image is a user selected image.

3. The computer of claim 2, wherein the user selected image is from the camera.

4. The computer of claim 1, wherein the window has a window background, the processor circuitry to set a display color of the window background based on the second color characteristic of the second background image.

5. The computer of claim 1, wherein the first background image has a first color theme and the second background image has a second color theme.

6. The computer of claim 1, wherein the processor circuitry is to:

determine whether the second color characteristic of the second background image is within a first range or a second range;

select a first value for the fourth display color of the text if the second color characteristic is within the first range; and select a second value, different than the first value, for the fourth display color of the text if the second color characteristic is within the second range.

7. The computer of claim 1, wherein the third display color is a color from the second background image.

8. The computer of claim 1, further including a sensor to detect an ambient light condition.

9. The computer of claim 8, wherein the processor circuitry is to adjust the third and fourth display colors based on the ambient light condition.

10. The computer of claim 1, wherein the second color characteristic includes at least one of brightness, average color, or color saturation.

11. A computer comprising:
a camera;
wireless communication circuitry;
a touchscreen to present at least a portion of at least one background image, at least one window, and text associated with the window;
memory; and
processor circuitry to execute instructions to, in response to a change in the at least one background image from a first background image to a second background image:
  adjust a display color of the window from a first display color based on a first color characteristic of the first background image to a second display color based on a second color characteristic of the second background image; and
  adjust a display color of the text from a third display color based on the first color characteristic of the first background image to a fourth display color based on the second color characteristic of the second background image.

12. The computer of claim 11, wherein the second background image is a user selected image.

13. The computer of claim 12, wherein the user selected image is from the camera.

14. The computer of claim 11, wherein the window has a window background, the processor circuitry to set a display color of the window background based on the second color characteristic of the second background image.

15. The computer of claim 11, wherein the first background image has a first color theme and the second background image has a second color theme.

16. The computer of claim 11, wherein the processor circuitry is to:
determine whether the second color characteristic of the second background image is within a first range or a second range;
select a first value for the fourth display color of the text if the second color characteristic is within the first range; and
select a second value, different than the first value, for the fourth display color of the text if the second color characteristic is within the second range.

17. The computer of claim 11, wherein the third display color is a color from the second background image.

18. The computer of claim 11, further including a sensor to detect an ambient light condition.

19. The computer of claim 18, wherein the processor circuitry is to adjust the second and fourth display colors based on the ambient light condition.

20. The computer of claim 11, wherein the second color characteristic includes at least one of brightness, average color, or color saturation.

* * * * *